US006865475B2

(12) United States Patent
Willenbrock

(10) Patent No.: US 6,865,475 B2
(45) Date of Patent: Mar. 8, 2005

(54) METHOD FOR DETERMINING TRAFFIC RELATED INFORMATION

(75) Inventor: Ralf Willenbrock, Berlin (DE)

(73) Assignee: Volkswagen AG, Wolfsburg (DE)

(*) Notice: Subject to any disclaimer, the term of this patent is extended or adjusted under 35 U.S.C. 154(b) by 0 days.

(21) Appl. No.: 10/332,831

(22) PCT Filed: Jul. 17, 2001

(86) PCT No.: PCT/EP01/08237

§ 371 (c)(1), (2), (4) Date: Jun. 30, 2003

(87) PCT Pub. No.: WO02/07125

PCT Pub. Date: Jan. 24, 2002

(65) Prior Publication Data

US 2004/0039516 A1 Feb. 26, 2004

(30) Foreign Application Priority Data

Jul. 19, 2000 (DE) ........................................ 100 35 501
Jul. 6, 2001 (DE) ........................................ 100 33 001

(51) Int. Cl.[7] ............................ G06F 19/00; G06G 7/76

(52) U.S. Cl. ....................... 701/117; 701/118; 701/200; 73/178 R

(58) Field of Search ................................ 701/117, 118, 701/200, 36; 73/178 R; 340/995.13

(56) References Cited

U.S. PATENT DOCUMENTS

| | | | | |
|---|---|---|---|---|
| 5,483,446 A | | 1/1996 | Momose et al. | |
| 5,539,645 A | | 7/1996 | Mandhyan et al. | |
| 5,566,072 A | | 10/1996 | Momose et al. | |
| 5,822,712 A | * | 10/1998 | Olsson | 701/117 |
| 5,912,822 A | * | 6/1999 | Davis et al. | 702/143 |
| 6,329,932 B1 | * | 12/2001 | Fastenrath | 340/934 |

FOREIGN PATENT DOCUMENTS

| | | |
|---|---|---|
| DE | 195 21 919 | 5/1996 |
| DE | 195 08 489 | 9/1996 |
| DE | 196 38 069 | 3/1998 |
| DE | 100 52 109 | 6/2001 |
| EP | 0 789 341 | 8/1997 |
| JP | 7-234989 | 9/1995 |
| JP | 8-161685 | 6/1996 |
| JP | 11-86184 | 3/1999 |

* cited by examiner

*Primary Examiner*—Olga Hernandez
(74) *Attorney, Agent, or Firm*—Kenyon & Kenyon

(57) ABSTRACT

In a method for determining traffic-related information within a traffic system with the aid of mobile detectors, e.g., vehicles selected at random, the information which is used for determining the traffic situation includes at least the standard deviation of the driven speed of the mobile detector compared to the average speed of the mobile detector on a section of a road and/or the sum of the stationary time on the section of the road.

77 Claims, 3 Drawing Sheets

METHOD FOR DETERMINING TRAFFIC RELATED INFORMATION

FIELD OF THE INVENTION

The present invention relates to a method for determining traffic situation information within a traffic system using mobile detectors, e.g., vehicles of a random-sample fleet, that have a terminal; a control center for determining traffic situation information within a traffic system that obtains, from at least one mobile detector, data regarding its geographic position; a terminal in a mobile detector that contains at least one position identification device or is connected thereto, and encompasses a data processing device and a device for data exchange with the control center; and a software program product that may be loaded directly into an internal memory of a control center and/or of the terminal of a mobile detector.

BACKGROUND INFORMATION

The acquisition and description of a traffic situation is an essential task in the field of traffic telematics, the goal of which, for example, is to inform traffic participants about situations with traffic impediments and to rectify such situations and, if applicable, prevent them by appropriate predictive diversion of traffic participants onto less-crowded routes. Another task is that of determining information for traffic planning and road system planning.

A wide variety of approaches to determining traffic information is conventional. German Published Patent Application No. 195 08 486, for example, describes a method for determining traffic situation data or road status data in which individual random-sample vehicles, referred to as "floating cars," transmit predetermined vehicle data and associated position data to a traffic control center. The traffic control center determines the traffic situation by the received data based on specific algorithms.

German Published Patent Application No. 195 21 919 describes a method for transmitting traffic situation information in which the vehicle and position data that are acquired are already allocated, in the vehicle operating as detector, to at least one predefined category of vehicle and position data that correspond to a specific typical vehicle behavior. These categories are referred to as "vehicle behavior patterns." The associated vehicle behavior pattern is transferred with the position data of the vehicle, at least partially in coded form, to the traffic control center. European Published Patent Application No. 0 789 341 describes, in order to determine traffic situation information, to utilize the speed of the vehicle as vehicle data in the terminal of the mobile detector, by continuously acquiring it and evaluating it in the terminal by comparison with a limit speed as reference in the detector, so that when said speed falls below the limit speed, a change in traffic status lying below the threshold is recognized. The terminal, which is then in the evaluation state t0, then checks the acquired speed values by comparison with the limit speed and, after a time t0+t1 has elapsed, interprets the overall traffic condition on the route segment as a traffic disruption if the mobile detector is being driven at a speed lower than the stored limit speed. If a traffic condition has been analyzed by the terminal as disrupted, an appropriate data telegram is generated and is transmitted via a mobile radio network to the traffic control center.

The disadvantage of conventional methods is principally that a large number of false and/or irrelevant messages are generated. In particular, long waits at traffic lights, barriers, etc. in urban areas, as well as deceleration actions before encountering rural population centers, are detected as traffic disruptions and are forwarded to customers.

It is an object of the present invention to provide the determination of traffic situation information so that the quantity of false and/or irrelevant traffic situation information may be further reduced, and an accurate picture of the traffic situation may be obtained.

SUMMARY

The object of the present invention may be achieved by providing a method, a control center, a terminal and a software program product as described herein.

Provision is made according to the present invention to use, for traffic situation assessment using mobile detectors, at least the standard deviation, i.e., the average deviation, of the speed being driven by the mobile detector from the mean speed of the mobile detector on a route segment, and/or the stand still times on the route segment being traveled.

The processable data for the route segments or the road system that are employed for traffic situation assessment are generated, for example, using a method as described in German Published Patent Application No. 100 52 109.

According to an example embodiment of the present invention, the following steps are performed in this context. In a first method step, the mean speed of a mobile detector on at least one route segment being traveled by it is determined. A determination is additionally made of the standard deviation of the speed being driven by the detector from the mean speed or the average speed on the route segment being traveled, and/or of the sum of the stand still times of the mobile detector with respect to the travel time of the mobile detector on the route segment, the sum of the travel times being indicated, e.g., in proportion to the travel time.

The determined standard deviation of the route segment being traveled, as a function of the mean speed on the route segment being traveled, is compared to at least one boundary profile that is defined on the basis of the standard deviation and the mean speed. In other words, a point in a coordinate system constituted from the standard deviation and mean speed, that is, e.g., in a region next to or on the at least one boundary profile, is defined from the standard deviation and the mean speed.

Additionally or solely, a comparison may be made of the sum of the stand still times in proportion to the travel time on the route segment being traveled, as a function of the mean speed on the route segment, to at least one boundary profile that is defined with reference to the sum of the stand still times on the route segment being traveled and the mean speed. In other words, once again a coordinate system is constituted from the ratio of the sum of the stand still times to the travel time on the predefined route segment and the mean speed on the route segment. At least one boundary profile for the definition of traffic conditions is determined in this coordinate system, and the coordinate point that is constituted from the sum of the stand still times for the travel time and the mean speed is described in the coordinate system. In a further method step, a determination is made of the traffic situation on the route segment on the basis of the comparison of the standard deviation as a function of the mean speed, and/or on the basis of the comparison of the sum of the stand still times in proportion to the travel time as a function of the mean speed, to the respective boundary profile. Each of the boundary profiles may define the boundary between two traffic conditions.

According to an example embodiment of the present invention, multiple boundary profiles that define various traffic conditions—such as “jammed,” “dense,” “slow-moving traffic,” or “clear”—may be provided both for the standard deviation as a function of the mean speed and for the sum of the stand still times as a function of the mean speed.

To prevent so-called “oscillations” about a boundary profile, the boundary profiles may exhibit a so-called hysteresis. In other words, a different value or value profile of the boundary profile is to be used depending on the traffic condition from which a change in the boundary profile proceeds.

An example embodiment of the present invention furthermore provides for the boundary profiles for definition of the traffic conditions to be stipulated on the basis of road type (expressway, secondary road, etc.). The possibility also exists, however, of defining the boundary profiles on a route-dependent basis. Parameters such as curve radii, hills, etc. may play a role here.

In an example embodiment of the present invention, the present invention further provides for the boundary profiles to be defined on the basis of infrastructure (intersections, traffic lights, on- and off-ramps, type of development along the route segment, etc.). A time-dependent definition of the boundary profiles is also possible. For example, the boundaries provided during rush hours may be different from those on weekends.

An example embodiment of the present invention may provide for the boundary profiles to be defined not statically but dynamically: if the situation on a route segment changes, the boundary profiles are adapted to the particular situation.

According to an example embodiment of the present invention, provision may be made for a traffic situation determination to be made at least on the basis of the maximum permitted speed on a route segment, on the basis of the standard deviation as a function of the mean speed, and/or on the basis of the sum of the stand still times as a function of the mean speed. Therefore, on expressways and highways a traffic situation determination may be made on the basis of the standard deviation, and on city streets a traffic situation determination may be made on the basis of stand still times on the route segments. Traffic situation determinations on the basis of the standard deviation and the stand still times are, however, also possible.

Another example embodiment of the present invention provides for a traffic situation determination to be made in at least infrastructure-dependent fashion on the basis of the standard deviation as a function of the mean speed, and/or on the basis of the sum of the stand still times as a function of the mean speed.

Provision may furthermore be made for the acceleration behavior of the mobile detector additionally to be employed for traffic situation determination. This may provide that a more accurate distinction may be distinguished between traffic-light phases and a jam on a route segment.

According to the present invention, the traffic situation determination may be performed both in a control center and in the mobile detector. If the determination is made in the control center, the respective mobile detector sends at least its time-related position data to the control center, which may determine speeds therefrom. Provision may also be made, however, for the respective mobile detector additionally to send its speed data. If the traffic situation is determined directly by the mobile detector, an example embodiment of the present invention provides for the mobile detector to receive data about an expected or current traffic situation, and for it to send data regarding the traffic situation to the control center only in the event of a change in the traffic situation. The possibility also exists for the mobile detector not to transmit its data to the control system during the journey, but rather to transfer the data after completion of the journey. A method of this kind may be used, for example, in traffic route planning.

According to the present invention, the control center for determining traffic situation information may be provided so that it performs or may perform the method according to the present invention. It has a data communication connection to the mobile detectors, by which it obtains position data, and optionally vehicle status data, of the mobile detector.

The present invention furthermore provides a terminal in a mobile detector that contains at least one position identification device or is connected thereto, and encompasses a data processing device and a device for data exchange with a control center, the terminal being configured to perform the method according to the present invention.

An example embodiment of the terminal according to the present invention provides for the terminal to determine its speed from its time-related position data. It may, however, receive the speed of the mobile detector from a vehicle speed sensor or from vehicle status data.

The present invention further provides a software program product that may be loaded directly into an internal memory of the control center and/or of the terminal of a mobile detector, and that encompasses program steps with which the method steps in accordance with the method according to the present invention are performed and/or are executable when the program product is executed in the control center and/or in the terminal.

The present invention is described in more detail below with reference to an example embodiment.

DETAILED DESCRIPTION

Figure 1:
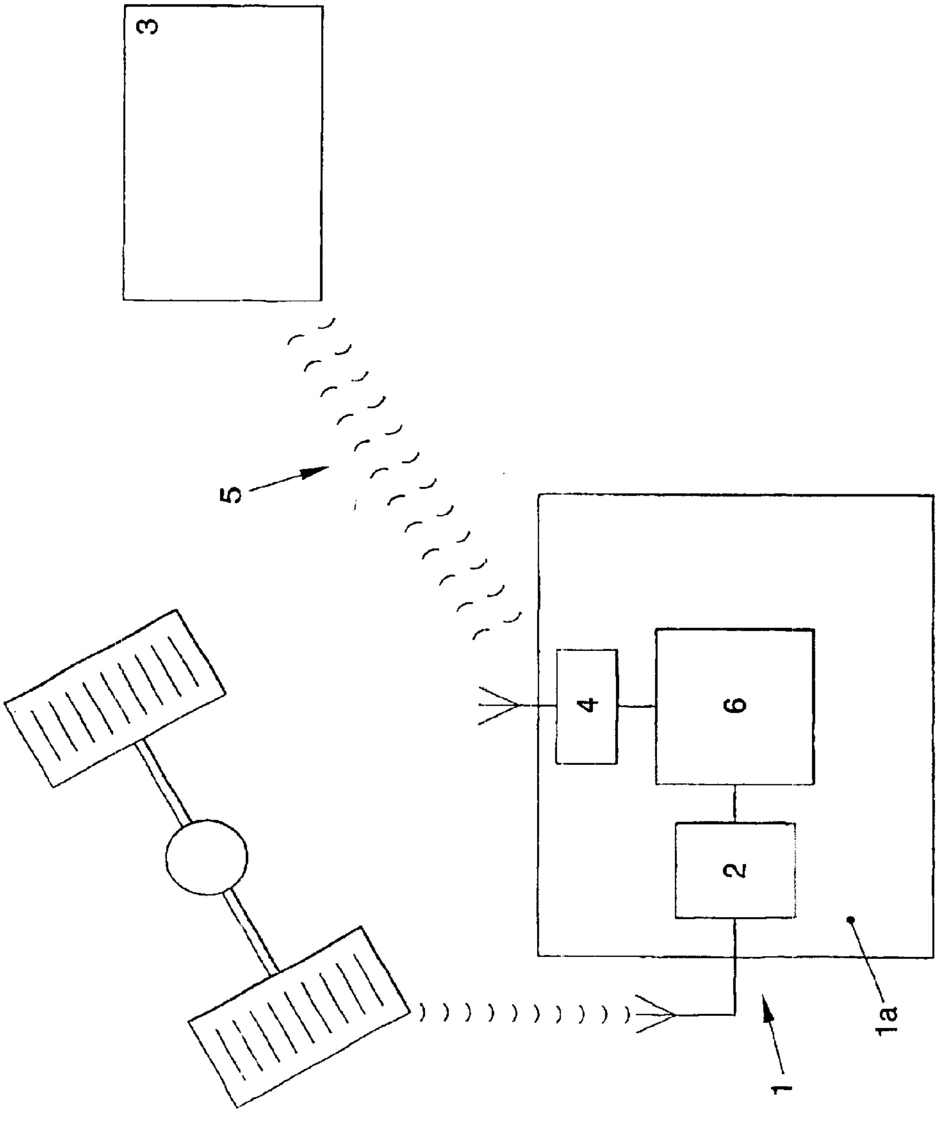
FIG. 1 is a block diagram of a system for determining the traffic situation.

FIG. 1 illustrates a system for acquiring traffic situation information on a route being traveled by at least one mobile detector 1, e.g., a vehicle of a random-sample fleet. Terminal 1*a* of a mobile detector 1 has a position identification device for determining the geographical coordinates of its instantaneous location, e.g., a satellite-based sensing device 2; a data processing device 6; and a device 4 for bidirectional data communication with a corresponding communication device of a control center 3. By this data communication link, terminal 1*a* communicates via a point-to-point procedure with control center 3, and in the simplest case sends its geographical coordinates, acquired in time-related fashion, to control center 3, which determines from the change over time in the geographical coordinates of mobile detector 1, using the method according to the present invention, the traffic situation on a route segment and/or the travel times on the route segment. Another possibility is that terminal 1*a,* in data processing device 6, itself determines the speed of the mobile detector from the position data or receives it from an acquisition device, and by the method according to the present invention determines the traffic situation and, on the basis of predefined criteria, e.g., on the basis of a comparison with instantaneous and/or expected values with data of the relevant route segment, for example, as generated according to a method such as the one described in German Published Patent Application No. 100 52 109, sends it to control center 3. The data for the route segment of for a determination network for the traffic situation either are stored in data processing device 6 or are transferred to mobile detectors 1 via a communication procedure, for example, on the basis of their position, from control center 3.

The method according to the present invention will be explained in more detail below with reference to FIGS. 2 and 3, based on an example. In this example, the traffic route system that is to be evaluated, which contains only the route segments of the actual road system that appear relevant for a traffic situation assessment, is subdivided into three road types. These are firstly the expressways and highways having a very high maximum permitted speed, secondary roads, and city streets having traffic signal systems and intersections.

In the example embodiment, the standard deviation σ as a function of the mean speed $v_m$ of mobile detector 1 on route segment A-B is employed for assessment of the traffic situation on the expressways and highways. For that purpose, the instantaneous speed $v_i$ of mobile detector 1 is acquired, continuously or at defined time intervals, or is calculated from the change over time in the position data on route segment A-B. The mean speed $v_m$ of mobile detector 1 on the route segment is determined therefrom. From that, the standard deviation σ of the speed $v_i$ being driven by mobile detector 1 from the mean speed $v_m$ is determined.

The standard deviation σ is calculated using the following formula:

$$\sigma = \left( \frac{\sum_{i=0}^{n} (Vm - Vi)^2}{N(N-1)} \right)^{1/2}$$

where n is the number of time-related positions of the mobile detector that are determined.

Figure 2A:
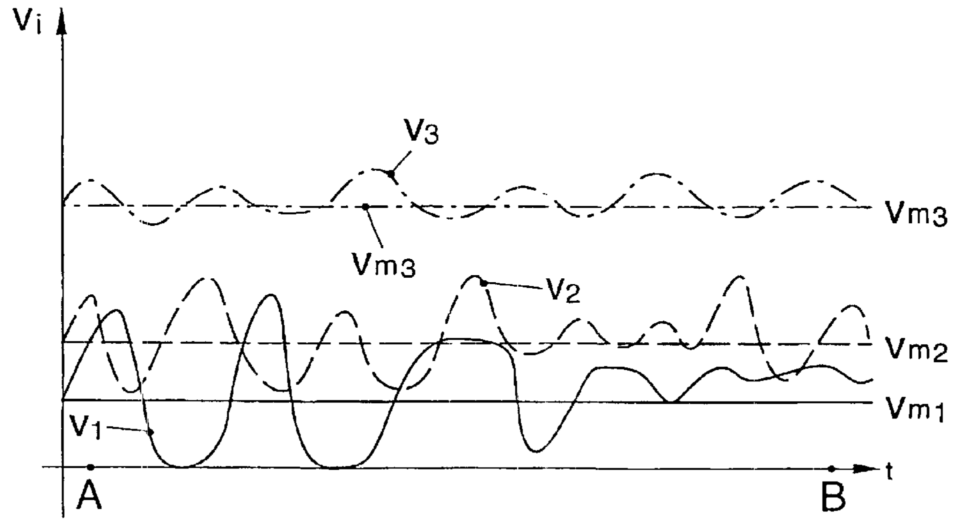
FIG. 2 illustrates an example of determination of the traffic situation using the standard deviation.
Figure 2B:
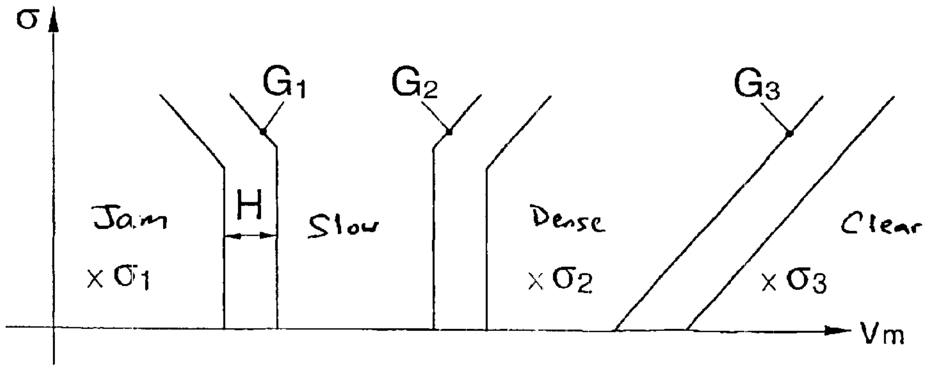

FIG. 2*a* illustrates several curves for the speed $v_i$ and mean speed $v_m$ on route segment A-B for different traffic conditions. If the standard deviation σ as a function of the mean speed $v_m$ is then calculated for each of the speed curves $v_1$, $v_2$, $v_3$, and is compared to various boundary profiles G1, G2, G3 that define different traffic conditions on route segment A-B, what is obtained is the traffic situation during the journey of mobile detector 1 along the route segment. During the journey along the route segment at speed $v_i$, the mean speed $v_{m1}$ was relatively low, but the standard deviation σ was very high because of the stop-and-go behavior of mobile detector 1. This is recognized as a “jam”. The journey at speed $v_2$ exhibits a mean speed $v_m$ of approx. 80 km/h with a low standard deviation σ. This is recognized as “dense” traffic. The journey at speed $v_3$ exhibits a high mean speed $v_m$ with a low standard deviation σ. Route segment A-B is “clear”. To prevent oscillations between two traffic conditions when recognizing the traffic situation, a hysteresis H was additionally introduced for each boundary profile.

Figure 3A:
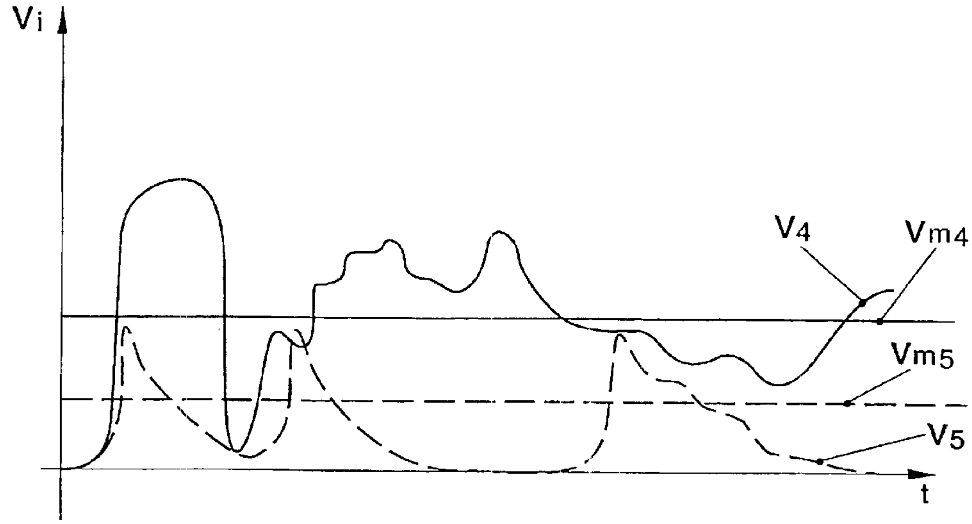
FIG. 3 illustrates an example of determination of the traffic situation by the sum of stand still times.
Figure 3B:
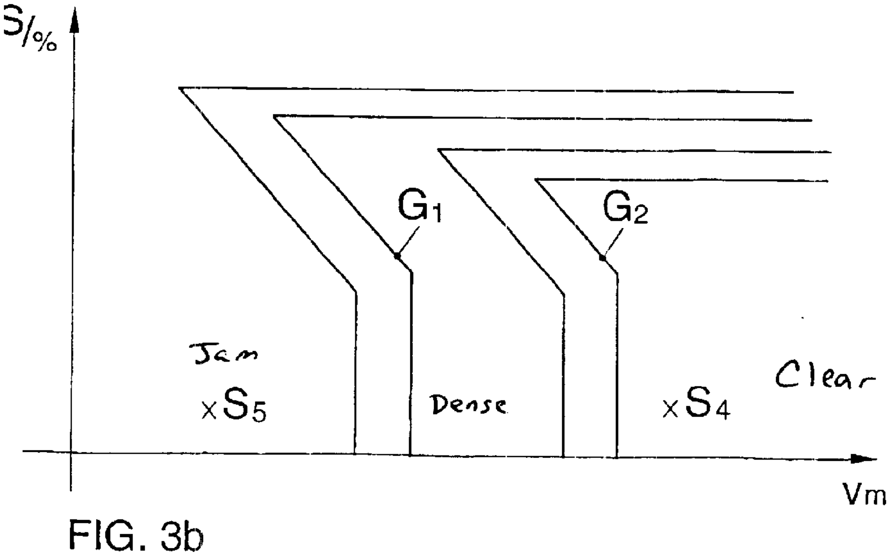

For traffic situation determination on city streets, the problem may exist that the traffic signal systems impose a pronounced stop-and-go behavior that may be distinguished from actual traffic jams. For this reason, on city streets it may be provided to perform a traffic situation acquisition using the sum of the stand still times on a route segment. FIG. 3*a* illustrates the speed curves $v_4$, $v_5$ for two journeys by mobile detectors 1 along a route segment A-B of a city street. As illustrated, the stationary component S of travel time t on route segment A-B during the journey at speed $v_5$ is relatively large, and the mean speed $v_m$ is low. If the stationary component S (as a percentage) as a function of the mean speed $v_m$ is compared to boundary profiles G1 and G3 (FIG. 3*b*), it is illustrated that the route segment was jammed. During the journey at speed $v_4$, the route segment was clear. Optionally, the standard deviation may be considered as an additional criterion for traffic situation determination on city streets.

On secondary roads with a maximum permitted speed of up to 100 km/h, a traffic situation determination may be performed by the standard deviation of the speed $v_i$ being driven by the mobile detector from the mean speed $v_m$, in which context both the number of boundary profiles G and their profiles may be different by comparison with a traffic situation determination on expressways and highways. Provision may also be made for the traffic in the opposite direction, i.e., the traffic situation in the oncoming lane, and/or the acceleration of mobile detector 1, to be taken into account. It is additionally possible to take into account the stationary component, e.g., in borderline areas between two traffic conditions.

What is claimed is:

1. A method for determining traffic situation information within a traffic system using mobile detectors, the mobile detectors including a terminal, comprising:

determining a mean speed of at least one mobile detector on at least one route segment traveled thereby;

determining a standard deviation of a speed being driven by the mobile detector in accordance with at least one of the mean speed on the route segment being traveled and a sum of stand still times of the mobile detector on the route segment being traveled, comparing at least one of:

the standard deviation as a function of the mean speed on the route segment being traveled to at least one boundary profile that defines a boundary between two traffic conditions and that is defined in accordance with the standard deviation and the mean speed; and the sum of the stand still times on the route segment being traveled, as a function of the mean speed on the route segment being traveled, to at least one boundary profile that defines the boundary between two traffic conditions and that is defined in accordance with the sum of the stand still times on the route segment being traveled and the mean speed on the route segment; and determining the traffic situation in accordance with at least one of:

the comparison of the standard deviation as a function of the mean speed to the at least one boundary profile that is defined on the basis of the standard deviation and the mean speed; and the comparison of the sum of the stand still times as a function of the mean speed to the at least one boundary profile that is defined on the basis of the sum of the stand still times and the mean speed on the route segment.

2. The method according to claim 1, wherein the mobile detectors are arranged in vehicles of a random-sample fleet.

3. The method according to claim 1, further comprising providing multiple boundary profiles that are defined in accordance with standard deviation and mean speed on a route segment.

4. The method according to claim 1, further comprising providing multiple boundary provides that are defined in accordance with the sum of the stand still times on the route segment being traveled and the mean speed on the route segment.

5. The method according to claim 1, wherein at least one boundary profile includes a hysteresis.

6. The method according to claim 1, further comprising defining the boundary profiles in accordance with road type for definition of traffic conditions.

7. The method according to claim 1, further comprising defining the boundary profiles on a route-dependent basis.

8. The method according to claim 1, further comprising defining the boundary profiles in infrastructure-dependent fashion.

9. The method according to claim 1, further comprising defining the boundary profiles in time-dependent fashion.

10. The method according to claim 1, wherein the boundary profiles are modifiable.

11. The method according to claim 1, wherein the traffic situation is determined in the determining step in accordance with at least one of the standard deviation as a function of the mean speed and the sum of the stand still times as a function of the mean speed and at least on the basis of a maximum permitted speed on the route segment.

12. The method according to claim 1, wherein the traffic situation is determined in the determining step in at least infrastructure-dependent fashion in accordance with at least one of the standard deviation as a function of the mean speed and the sum of the stand still times as a function of the mean speed on the route segment.

13. The method according to claim 1, wherein the traffic situation is determined in the determining step in accordance with acceleration behavior of the mobile detector.

14. The method according to claim 1, wherein the determining step is performed in a control center configured to receive at least time-related data for a position of the at least one mobile detector.

15. The method according to claim 1, wherein the determining step is performed in the terminal of the mobile detector, the method further comprising at least one of sending and transferring data relating to the traffic situation to a control center.

16. The method according to claim 15, further comprising:

sending data relating to an expected traffic situation from the control center to the mobile detector; and transmitting data relating to the determined traffic situation from the mobile detector to the control center substantially only in accordance with a change in the expected traffic situation.

17. A control center for determining traffic situation information within a traffic system, the control center configured to obtain from at least one mobile detector data relating to a geographic position of the at least one mobile detector and configured to perform a method for determining traffic situation information within the traffic system using the mobile detectors, the mobile detectors including a terminal the method including the steps of:

determining a mean speed of at least one mobile detector on at least one route segment traveled thereby;

determining a standard deviation of a speed being driven by the mobile detector in accordance with at least one of the mean speed on the route segment being traveled and a sum of stand still times of the mobile detector on the route segment being traveled, comparing at least one of:

the standard deviation as a function of the mean speed on the route segment being traveled to at least one boundary profile that defines a boundary between two traffic conditions and that is defined in accordance with the standard deviation and the mean speed; and the sum of the stand still times on the route segment being traveled, as a function of the mean speed on the route segment being traveled, to at least one boundary profile that defines the boundary between two traffic conditions and that is defined in accordance with the sum of the stand still times on the route segment being traveled and the mean speed on the route segment; and determining the traffic situation in accordance with at least one of:

the comparison of the standard deviation as a function of the mean speed to the at least one boundary profile that is defined on the basis of the standard deviation and the mean speed; and the comparison of the sum of the stand still times as a function of the mean speed to the at least one boundary profile that is defined on the basis of the sum of the stand still times and the mean speed on the route segment.

18. The control center according to claim 17, wherein the mobile detectors are arranged in vehicles of a random-sample fleet.

19. The control center according to claim 17, wherein the method further includes providing multiple boundary profiles that are defined in accordance with standard deviation and mean speed on a route segment.

20. The control center according to claim 17, wherein the method further includes providing multiple boundary provides that are defined in accordance with the sum of the stand still times on the route segment being traveled and the mean speed on the route segment.

21. The control center according to claim 17, wherein at least one boundary profile includes a hysteresis.

22. The control center according to claim 17, wherein the method further includes defining the boundary profiles in accordance with road type for definition of traffic conditions.

23. The control center according to claim 17, wherein the method further includes defining the boundary profiles on a route-dependent basis.

24. The control center according to claim 17, wherein the method further includes defining the boundary profiles in infrastructure-dependent fashion.

25. The control center according to claim 17, wherein the method further includes defining the boundary profiles in time-dependent fashion.

26. The control center according to claim 17, wherein the boundary profiles are modifiable.

27. The control center according to claim 17, wherein the traffic situation is determined in the determining step in accordance with at least one of the standard deviation as a function of the mean speed and the sum of the stand still times as a function of the mean speed and at least on the basis of a maximum permitted speed on the route segment.

28. The control center according to claim 17, wherein the traffic situation is determined in the determining step in at least infrastructure-dependent fashion in accordance with at least one of the standard deviation as a function of the mean speed and the sum of the stand still times as a function of the mean speed on the route segment.

29. The control center according to claim 17, wherein the traffic situation is determined in the determining step in accordance with acceleration behavior of the mobile detector.

30. The control center according to claim 17, wherein the determining step is performed in the control center and the control center is configured to receive at least time-related data for a position of the at least one mobile detector.

31. The control center according to claim 17, wherein the determining step is performed in the terminal of the mobile detector, the method further comprising at least one of sending and transferring data relating to the traffic situation to the control center.

32. The control center according to claim 31, wherein the method further includes:

sending data relating to an expected traffic situation from the control center to the mobile detector; and transmitting data relating to the determined traffic situation from the mobile detector to the control center substantially only in accordance with a change in the expected traffic situation.

33. The control center according to claim 17, wherein the control center is configured to receive from the mobile detector time-related data relating to the geographic position of the mobile detector.

34. The control center according to claim 17, wherein the control center is configured to receive vehicle status data of the mobile detector.

35. The control center according to claim 34, wherein the vehicle status data includes at least instantaneous speed.

36. A terminal in a mobile detector, comprising:

at least one of at least one position identification device and an arrangement configured to connect to at least one position identification device;

a data processing device;

a device configured to exchange data with a control center;

wherein the terminal is configured to perform a method for determining traffic situation information within a traffic system using mobile detectors, the mobile detectors including the terminal, the method including the steps of:

determining a mean speed of at least one mobile detector on at least one route segment traveled thereby, determining a standard deviation of a speed being driven by the mobile detector in accordance with at least one of the mean speed on the route segment being traveled and a sum of stand still times of the mobile detector on the route segment being traveled;

comparing at least one of:

the standard deviation as a function of the mean speed on the route segment being traveled to at least one boundary profile that defines a boundary between two traffic conditions and that is defined in accordance with the standard deviation and the mean speed; and the sum of the stand still times on the route segment being traveled, as a function of the mean speed on the route segment being traveled, to at least one boundary profile that defines the boundary between two traffic conditions and that is defined in accordance with the sum of the stand still times on the route segment being traveled and the mean speed on the route segment; and determining the traffic situation in accordance with at least one of:

the standard deviation as a function of the mean speed on the route segment being traveled to at least one boundary profile that defines a boundary between two traffic conditions and that is defined in accordance with the standard deviation and the mean speed, and the sum of the stand still times on the route segment being traveled, as a function of the mean speed on the route segment being traveled, to at least one boundary profile that defines the boundary between two traffic conditions and that is defined in accordance with the sum of the stand still times on the route segment being traveled and the mean speed on the route segment; and determining the traffic situation in accordance with at least one of:

the comparison of the standard deviation as a function of the mean speed to the at least one boundary profile that is defined on the basis of the standard deviation and the mean speed, and the comparison of the sum of the stand still times as a function of the mean speed to the at least one boundary profile that is defined on the basis of the sum of the stand still times and the mean speed on the route segment.

37. The terminal according to claim 36, wherein the mobile detectors are arranged in vehicles of a random-sample fleet.

38. The terminal according to claim 36, wherein the method further includes providing multiple boundary profiles that are defined in accordance with standard deviation and mean speed on a route segment.

39. The terminal according to claim 36, wherein the method further includes providing multiple boundary provides that are defined in accordance with the sum of the stand still times on the route segment being traveled and the mean speed on the route segment.

40. The terminal according to claim 36, wherein at least one boundary profile includes a hysteresis.

41. The terminal according to claim 36, wherein the method further includes defining the boundary profiles in accordance with road type for definition of traffic conditions.

42. The terminal according to claim 36, wherein the method further includes defining the boundary profiles on a route-dependent basis.

43. The terminal according to claim 36, wherein the method further includes defining the boundary profiles in infrastructure-dependent fashion.

44. The terminal according to claim 36, wherein the method further includes defining the boundary profiles in time-dependent fashion.

45. The terminal according to claim 36, wherein the boundary profiles are modifiable.

46. The terminal according to claim 36, wherein the traffic situation is determined in the determining step in accordance with at least one of the standard deviation as a function of the mean speed and the sum of the stand still times as a function of the mean speed and at least on the basis of a maximum permitted speed on the route segment.

47. The terminal according to claim 36, wherein the traffic situation is determined in the determining stop in at least infrastructure-dependent fashion in accordance with at least one of the standard deviation as a function of the mean speed and the sum of the stand still times as a function of the mean speed on the route segment.

48. The terminal according to claim 36, wherein the traffic situation is determined in the determining step in accordance with acceleration behavior of the mobile detector.

49. The terminal according to claim 36, wherein the determining step is performed in the control center and the control center is configured to receive at least time-related data for a position of the at least one mobile detector.

50. The terminal according to claim 36, wherein the determining step is performed in the terminal of the mobile detector, the method further comprising at least one of sending and transferring data relating to the traffic situation to the control center.

51. The terminal according to claim 50, wherein the method further includes:

sending data relating to an expected traffic situation from the control center to the mobile detector, and transmitting data relating to the determined traffic situation from the mobile detector to the control center substantially only in accordance with a change in the expected traffic situation.

52. The terminal according to claim 50, wherein the control center is configured to receive from the mobile detector time-related data relating to the geographic position of the mobile detector.

53. The terminal according to claim 36, wherein the control center is configured to receive vehicle status data of the mobile detector.

54. The terminal according to claim 53, wherein the vehicle status data includes at least instantaneous speed.

55. The terminal according to claim 36, wherein the terminal is configured to determine a speed of the mobile detector in accordance with time-related position date of the mobile detector.

56. The terminal according to claim 36, wherein the terminal is configured one of to receive a speed of the mobile detector from a vehicle speed sensor and to determine the speed of the mobile detector from vehicle status data.

57. A software program product loadable directly into an internal memory of at least one of a control center and a terminal of a mobile detector, the software program product including program steps at least one of executed and executable by the at least one of the control center and the terminal, the program steps configured to perform a method for determining traffic situation information within a traffic system using mobile detectors, the method including the steps of:

determining a mean speed of at least one mobile detector on at least one route segment traveled thereby, determining a standard deviation of a speed being driven by the mobile detector in accordance with at least one of the mean speed on the route segment being traveled and a sum of stand still times of the mobile detector on the route segment being traveled;

comparing at least one of:

the standard deviation as a function of the mean speed on the route segment being traveled to at least one boundary profile that defines a boundary between two traffic conditions and that is defined in accordance with the standard deviation and the mean speed; and the sum of the stand still times on the route segment being traveled, as a function of the mean speed on the route segment being traveled, to at least one boundary profile that defines the boundary between two traffic conditions and that is defined in accordance with the sum of the stand still times on the route segment being traveled and the mean speed on the route segment; and determining the traffic situation in accordance with at least one of:

the comparison of the standard deviation as a function of the mean speed to the at least one boundary profile that is defined on the basis of the standard deviation and the mean speed and the comparison of the sum of the stand still times as a function of the mean speed to the at least one boundary profile that is defined on the basis of the sum of the stand still times and the mean speed on the route segment.

58. The computer program product according to claim 57, wherein the mobile detectors are arranged in vehicles of a random-sample fleet.

59. The computer program product according to claim 57, wherein the method further includes providing multiple boundary profiles that are defined in accordance with standard deviation and mean speed on a route segment.

60. The computer program product according to claim 57, wherein the method further includes providing multiple boundary provides that are defined in accordance with the sum of the stand still times on the route segment being traveled and the mean speed on the route segment.

61. The computer program product according to claim 57, wherein at least one boundary profile includes a hysteresis.

62. The computer program product according to claim 57, wherein the method further includes defining the boundary profiles in accordance with road type for definition of traffic conditions.

63. The computer program product according to claim 57, wherein the method further includes defining the boundary profiles on a route-dependent basis.

64. The computer program product according to claim 57, wherein the method further includes defining the boundary profiles in infrastructure-dependent fashion.

65. The computer program product according to claim 57, wherein the method further includes defining the boundary profiles in time-dependent fashion.

66. The computer program product according to claim 57, wherein the boundary profiles are modifiable.

67. The computer program product according to claim 57, wherein the traffic situation is determined in the determining step in accordance with at least one of the standard deviation as a function of the mean speed and the sum of the stand still times as a function of the mean speed and at least on the basis of a maximum permitted speed on the route segment.

68. The computer program product according to claim 57, wherein the traffic situation is determined in the determining step in at least infrastructure-dependent fashion in accordance with at least one of the standard deviation as a function of the mean speed and the sum of the stand still times as a function of the mean speed on the route segment.

69. The computer program product according to claim 57, wherein the traffic situation is determined in the determining step in accordance with acceleration behavior of the mobile detector.

70. The computer program product according to claim 57, wherein the determining step is performed in the control center and the control center is configured to receive at least time-related data for a position of the at least one mobile detector.

71. The computer program product according to claim 57, wherein the determining step is performed in the terminal of the mobile detector, the method further comprising at least one of sending and transferring data relating to the traffic situation to the control center.

72. The computer program product according to claim 71, wherein the method further includes sending data relating to an expected traffic situation from the control center to the mobile detector, and transmitting data relating to the determined traffic situation from the mobile detector to the control center substantially only in accordance with a change in the expected traffic situation.

73. The computer program product according to claim 71, wherein the control center is configured to receive from the mobile detector time-related data relating to the geographic position of the mobile detector.

74. The computer program product according to claim 57, wherein the control center is configured to receive vehicle status data of the mobile detector.

75. The computer program product according to claim 74, wherein the vehicle status data includes at least instantaneous speed.

76. The computer program product according to claim 57, wherein the terminal is configured to determine a speed of the mobile detector in accordance with time-related position date of the mobile detector.

77. The computer program product according to claim 57, wherein the terminal is configured one of to receive a speed of the mobile detector from a vehicle speed sensor and to determine the speed of the mobile detector from vehicle status data.

* * * * *